Jan. 4, 1949.    R. J. STODDARD    2,458,445
CRANE TRUCK
Filed Dec. 17, 1945    3 Sheets-Sheet 1
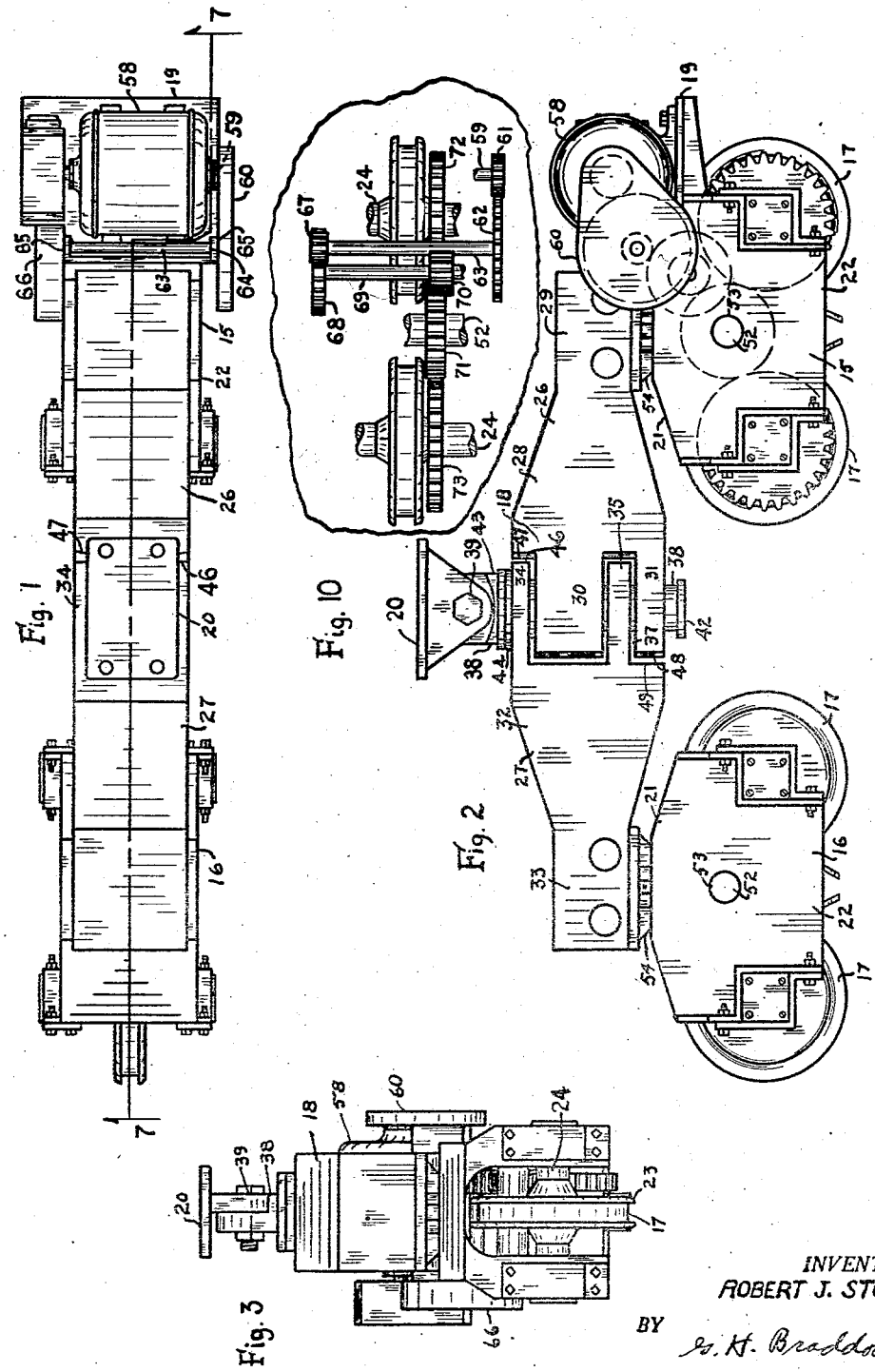
INVENTOR.
ROBERT J. STODDARD
BY
G. H. Braddock
ATTORNEY Jan. 4, 1949.   R. J. STODDARD   2,458,445
CRANE TRUCK
Filed Dec. 17, 1945   3 Sheets-Sheet 2
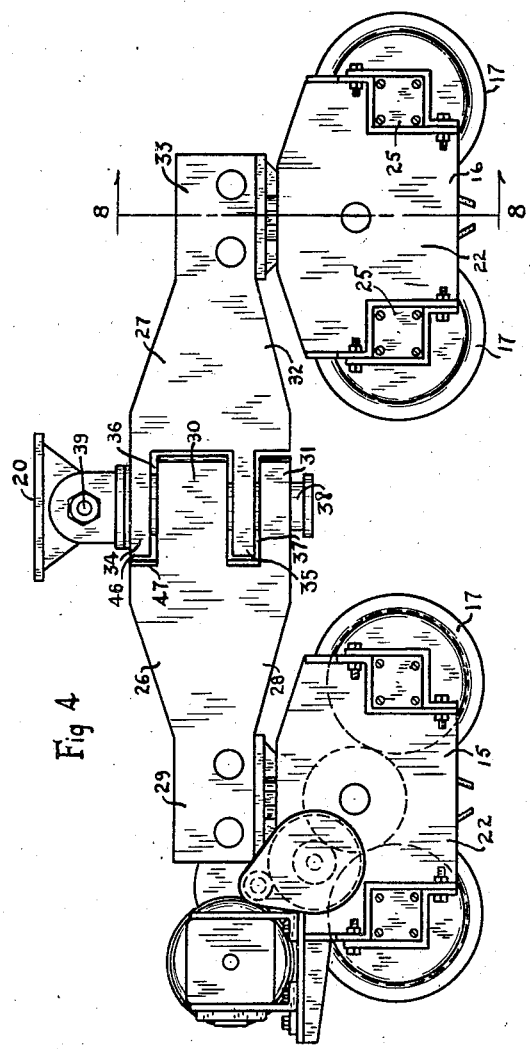
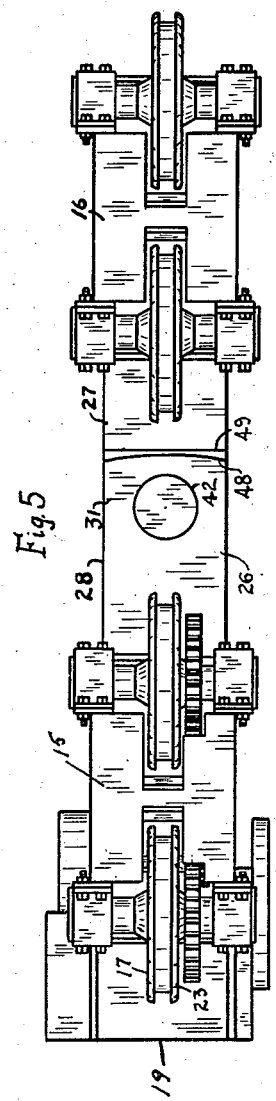
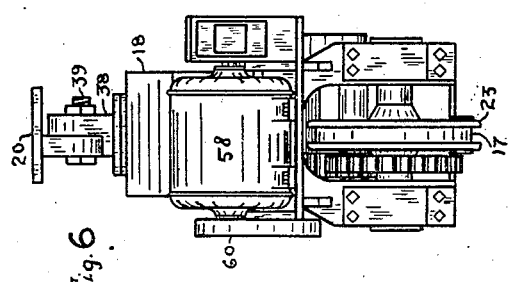
INVENTOR.
ROBERT J. STODDARD
BY
G. H. Braddock
ATTORNEY Jan. 4, 1949. R. J. STODDARD 2,458,445
CRANE TRUCK
Filed Dec. 17, 1945 3 Sheets-Sheet 3
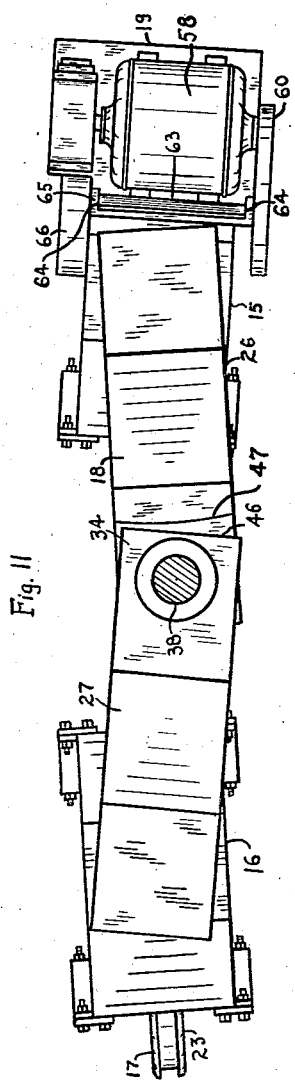
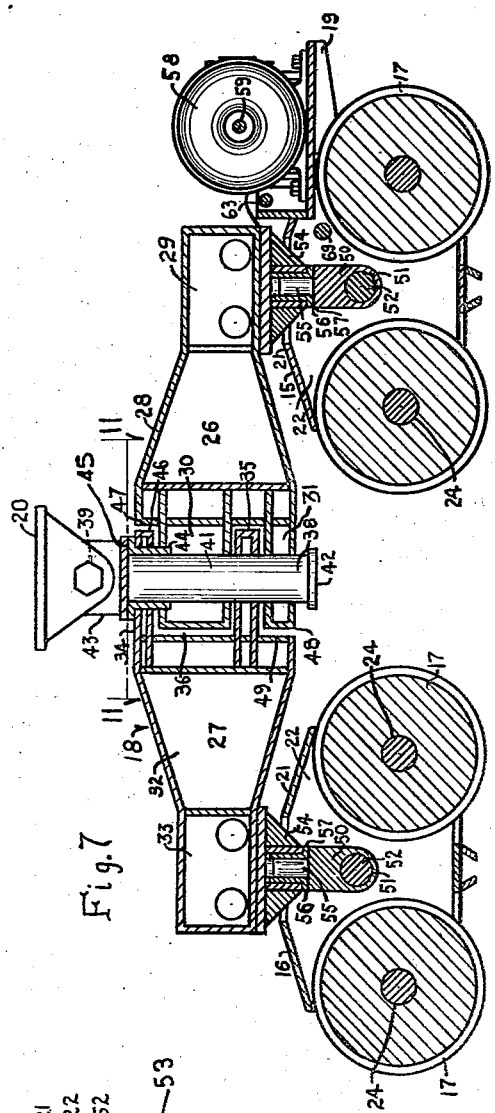
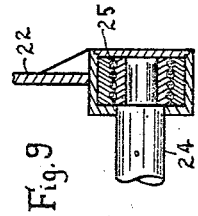
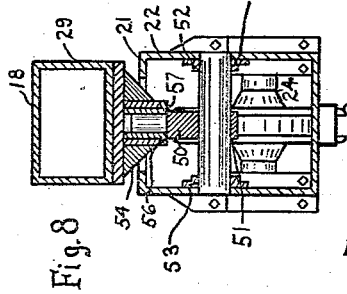
INVENTOR.
ROBERT J. STODDARD
BY
G. H. Braddock
ATTORNEY Patented Jan. 4, 1949

2,458,445

UNITED STATES PATENT OFFICE 2,458,445

CRANE TRUCK

Robert J. Stoddard, St. Paul, Minn., assignor to American Hoist & Derrick Co., St. Paul, Minn., a corporation of Delaware Application December 17, 1945, Serial No. 635,547

15 Claims. (Cl. 105—157)

This invention has relation to a truck, and has more especial relation to a crane truck, so-called.

An object of the invention is to provide a truck which will be of novel and improved construction.

A further object is to provide a so-called crane truck wherein will be incorporated various improved features and characteristics of construction which will be novel both as individual entities of the truck and in combination with each other.

A further object is to provide a truck which will include as a part thereof a girder frame consisting of separate girder elements assembled together in novel and improved manner.

A further object is to provide a truck which will include spaced apart truck frames, one of which desirably may support a truck motor frame, and a girder frame consisting of separate, hingedly connected girder elements between and assembled with said spaced apart truck frames in novel and improved manner.

A further object is to provide a crane truck adapted to function as one of several supports for the gantry of a revolver of a crane which will include spaced apart truck frames, a girder frame between and supported by said truck frames in such manner that the truck frames can swivel and equalize relative to the girder frame, and a gantry supporting vertical center pin with truck center plate assembled with said girder frame in such manner that the girder frame can swivel and equalize and have limited vertical movement relative to said truck center plate.

A further object is to provide a crane truck for supporting a part of the load of a revolver of a crane which will include spaced apart truck frames, a girder frame consisting of hingedly connected girder elements between and supported by said truck frames by mechanism adapted to permit swiveling and equalizing motion of the truck frames relative to the girder frame, and a gantry supporting vertical center pin with truck center plate assembled with said girder frame so that the girder frame will be adapted to have swiveling, equalizing and limited vertical motion relative to said truck center plate.

A further object is to provide a crane truck which will include a girder frame adapted to support a truck center plate in such manner that said girder frame can have swiveling, equalizing and limited vertical movement relative to said truck center plate, and spaced apart truck frames at either end of said girder frame associated with the girder frame in such manner that each of said truck frames can have swiveling and equalizing movement relative to said girder frame.

A further object is to provide a crane truck which will include a hinged girder frame adapted to support a vertical center pin with truck center plate assembled with said girder frame so as to permit the girder frame to have swiveling, equalizing and limited vertical movement relative to said truck center plate, and spaced apart truck frames supporting opposite end portions of said girder frame so as to permit said truck frames to have swiveling and equalizing movement relative to the girder frame.

A further object is to provide a truck which will include spaced apart truck frames, a hinged girder frame between and assembled with the truck frames so that each of said truck frames can have swiveling and equalizing movement relative to said girder frame, and a vertical center pin with truck center plate assembled with the girder frame so that said girder frame can have swiveling, equalizing and limited vertical movement relative to said truck center plate.

A further object is to provide a truck which will include a girder consisting of girder elements hingedly connected to each other at an intermediate portion of said girder frame for relative oscillatory movement in a horizontal plane and a truck frame at each end of the girder frame associated with the girder element at the corresponding end of said girder frame so that each truck frame can have swiveling and equalizing movement relative to the girder element with which associated as well as oscillatory movement, together as a unit with the associated girder element, in a horizontal plane relative to the other truck frame and its associated girder element.

A further object is to provide a truck which will include a vertical center pin with truck center plate, a girder frame consisting of girder elements hingedly connected to each other at an intermediate portion of said girder frame for relative oscillatory movement in a horizontal plane assembled with said vertical center pin so that said girder frame can have swiveling, equalizing and limited vertical movement relative to said truck center plate, and a truck frame at each end of the girder frame supporting the girder element at the corresponding end of said girder frame to permit swiveling and equalizing movement of each truck frame relative to its supported girder element and also permit each truck frame, together with its supported girder element as a unit, to have oscillatory movement in a horizontal plane relative to the other truck frame and its supported girder element.

A further object is to provide a truck of the present character which will include wheels to be driven, and a novel and improved construction and arrangement for driving said wheels.

And a further object is to provide a truck of structure as illustrated in the drawings and as hereinafter explicitly set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a top plan view of a truck including the features and characteristics of the invention;

Fig. 2 is a side elevational view of the truck of Fig. 1;

Fig. 3 is an end elevational view of the truck as seen from the left in Figs. 1 and 2;

Fig. 4 is a side elevational view disclosing the side of the truck opposite that shown in Fig. 2;

Fig. 5 is a bottom plan view of the truck;

Fig. 6 is an end elevational view as seen from the left in Fig. 4 disclosing the end of the truck opposite that shown in Fig. 3;

Fig. 7 is a longitudinal sectional view, taken substantially on line 7—7 in Fig. 1;

Fig. 8 is a transverse sectional view, taken on line 8—8 in Fig. 4;

Fig. 9 is a detail sectional view of a mounting for an axle of the truck;

Fig. 10 is a fragmentary plan view detailing driving mechanism of the truck; and Fig. 11 is a horizontal sectional view, taken on line 11—11 in Fig. 7.

With respect to the drawings and the numerals of reference thereon, the truck includes a pair of spaced apart trucks frames, denoted 15 and 16, respectively, each supported by wheels, represented 17. As shown, each truck frame 15, 16 is supported by a pair of wheels 17 arranged in tandem. A hinged girder frame of the truck, between the truck frames 15 and 16, is designated 18. A truck motor frame 19 is supported by the truck frame 15. The truck here disclosed is adapted for use as a crane truck, so-called, for supporting one corner of a structure (not shown), such as the gantry of a revolver of a crane, and to this end a usual truck center plate 20, carried by the hinged girder frame 18, is included.

Each truck frame 15, 16 consists of an inverted, elongated U-member having a horizontal base or upper wall 21 and spaced apart, vertical legs or side walls 22, 22. As disclosed, the U-members of the truck frames 15 and 16 are of equal width and of substantially equal length.

Each wheel 17 is flanged, as at 23, to be snugly ridable on a rail (not shown), and an axle 24 for each wheel is suitably and conveniently rotatably mounted, as at 25, in bearings supported by the oppositely disposed side walls 22, 22 of the U-member constituting the corresponding truck frame, 15 or 16 as the case may be, for the wheel. The axles 24 are, in the instance of each truck frame, spaced apart a distance to cause the wheels 17 carried by said axles to be in desired and predetermined spaced relation to each other.

The hinged girder frame 18 consists of a pair of elongated, rectilinear girder elements, designated 26 and 27, respectively.

The girder element 26 consists of a hollow intermediate portion 28 defined by upper, lower, side and end walls of said girder element 26, a box like portion 29 rigid with the outer end of the intermediate portion 28 and also defined by walls of the grider element 26, and spaced apart, horizontally disposed, vertically alined combination support-and-hinge entities, represented 30 and 31, respectively, rigid with the inner end of said intermediate portion 28. Each of the combination support-and-hinge entities 30, 31 is constituted as a rectilinear tongue extending inwardly from the intermediate portion 28 in the disclosure as made, and the box like portion 29, the intermediate portion 28 and the combination support-and-hinge entities or tongues 30, 31 are in alinement in direction longitudinally of the girder frame 18.

The girder element 27 consists of a hollow intermediate portion 32 defined by upper, lower, side and end walls of said girder element 27, a box like portion 33 rigid with the outer end of the intermediate portion 32 and also defined by walls of the girder element 27, and spaced apart, horizontally disposed, vertically alined combination support-and-hinge entities, represented 34 and 35, respectively, rigid with the inner end of said intermediate portion 32. Each of the combination support-and-hinge entities 34, 35 is constituted as a rectilinear tongue extending inwardly from the intermediate portion 32, and the box like portion 33, the intermediate portion 32 and the combination support-and-hinge entities or tongues 34, 35 also are in alinement in direction longitudinally of said girder frame 18.

As disclosed, each of the support-and-hinge entities or tongues 30, 31, 34, 35 extends continuously from side to side of the girder frame 18 and is of hollow conformation, and the support-and-hinge entities or tongues 30, 31 and 34, 35, respectively, are in overlapping relation to each other and vertically alined. The support-and-hinge entity or tongue 30 lies more or less snugly in an open sided rectilinear slot 36 between the support-and-hinge entity or tongue 34, above said support-and-hinge entity or tongue 30, and the support-and-hinge entity or tongue 35, below the support-and-hinge entity or tongue 30. And said support-and-hinge entity or tongue 35 lies more or less snugly in an open sided rectilinear slot 37 between said support-and-hinge entity or tongue 30, above the support-and-hinge entity or tongue 35, and the support-and-hinge entity or tongue 31, below said support-and-hinge entity or tongue 35.

A vertical center pin 38, at the midlength of the hinged girder frame 18, pivotally supports, as at 39, the truck center plate 20 for swinging movement of said truck center plate in a vertical plane extending longitudinally of the hinged girder frame 18, and said vertical center pin also constitutes a support for and a pivotal and vertically slidable connection between the girder elements 26 and 27. More explicitly, the vertical center pin 38 includes a cylindrical body portion 41 snugly situated in vertically alined cylindrical openings through the midwidths of the support-and-hinge entities or tongues 34, 30, 35, 31, an annular flange 42 upon the lower end of the body portion 41 beneath and in spaced relation to the support-and-hinge entity or tongue 31, and an enlarged head 43 upon the upper end of said body portion 41 above the support-and-hinge entity or tongue 34. The truck center plate 20 is mounted upon the enlarged head 43 of the vertical center pin 38, and said vertical center pin is supported upon the support-and-hinge entity or tongue 34 through the instrumentality of a bushing 44 upon the vertical center pin and in the cylindrical opening through the midwidth of said support-and-hinge entity or tongue 34 and a part of the cylindrical opening through the support-and-hinge entity or tongue 30. The enlarged head 43 of the vertical center pin 38 is supported upon a flange on the upper end of the bushing 44 through the instrumentality of a horizontal, downwardly facing, annular surface 45 of said enlarged head 43, in surrounding relation to the upper end of the cylindrical body portion 41 of said vertical center pin, adapted to be rested upon said flange. The construction and arrangement will be such that the vertical center pin 38, while permitting the girder elements 26 and 27 to have relative oscillatory movement, will, at the same time, be capable of functioning in cooperation with the support-and-hinge entities or tongues, or in cooperation with some of said support-and-hinge entities or tongues, to cause any load which may be placed upon or applied to the truck center plate 20 to be stably supported by the hinged girder frame 18. The construction and arrangement also will be such that said vertical center pin 38 will be capable of having limited vertical movement relative to said hinged girder frame.

The free end surface 46 of the support-and-hinge entity or tongue 34 is straight and is arranged transversely of the girder frame 18 in adjacent relation to a curvilinear surface 47 which extends crosswise of the girder element 27 at the upper side of the connected end of the support-and-hinge entity or tongue 30. The midlength of the curvilinear surface 47 is closest to the transverse surface 46 and the end portions of said curvilinear surface 47 slant in direction away from said transverse surface 46. The free end surface 48 of the support-and-hinge entity or tongue 31 is curvilinear and extends crosswise of the girder frame in adjacent relation to a straight surface 49 which extends transversely of said girder frame at the lower side of the connected end of the support-and-hinge entity or tongue 35. The midlength of the curvilinear surface 48 is closest to the transverse surface 49 and the end portions of said curvilinear surface 48 slant in direction away from said transverse surface 49. The surfaces 46, 47 and 48, 49, respectively, evidently will eventually come into engagement upon swinging movement of the girder elements 26 and 27 in a horizontal plane in either direction relative to each other. Stated otherwise, the construction and arrangement will be such that said surfaces 46, 47 and 48, 49 will be clear of each other while the girder elements 26 and 27 are in alined relation or swung in a horizontal plane relative to each other in either direction to a limited extent but will become engaged to preclude relative swinging movement of said girder elements beyond the limited extent intended. That is to say, the surfaces 46, 47 and 48, 49 constitute stops for limiting the extent to which it is possible to swing said girder elements relative to each other.

The box like portions 29, 33 secured to the outer ends of the intermediate portions 28, 32 of the girder elements 26, 27 are separately associated with the truck frames 15, 16 in such manner that said truck frames are situated at the opposite ends of the girder frame 18 and are free to have swiveling and equalizing movement. A vertical pivot member 50 of each truck frame 15, 16 includes a lower portion thereof rotatably supported, as at 51, upon a horizontal pivot pin 52 of the corresponding truck frame itself suitably and conveniently fixedly mounted, as at 53, 53 in the side walls 22, 22 of said corresponding truck frame. The horizontal pivot pin 52 of each truck frame is between and equidistantly spaced from the wheels 17, 17 at elevation slightly above said wheels in the disclosure as made. Each of supporting brackets for the box like portions 29, 33 of the girder elements 26, 27, beneath and secured to said box like portions, is indicated 54. Cylindrical, reduced upper end portions 55 of the vertical pivot members 50 of the truck frames 15, 16 are each rotatably and slidably socketed in a vertical opening in the supporting bracket 54 at the corresponding end of the girder frame, and said girder frame is supported on said truck frames in such manner as to permit the truck frames to be capable of having swiveling and equalizing movement relative to the girder elements of the girder frame. More explicitly, each supporting bracket 54 includes a lower horizontal surface 56 adapted to be rested upon an upwardly facing annular surface 57 of the corresponding vertical pivot member 50 in surrounding relation to the lower end of its cylindrical, reduced portion 55.

The truck motor frame 19, supported by the truck frame 15, is situated adjacent the outer end of the girder element 26 and suitably and conveniently supports an electric motor 58 including a driven shaft 59. As disclosed, said truck motor frame 19 is rigid with and in horizontal alinement with said truck frame 15.

The motor shaft 59 passes through an opening in a first gear case 60, suitably and conveniently supported upon the truck motor frame 19 and/or the truck frame 15, and fixedly carries a first pinion 61, situated in said first gear case 60, which meshes with a first gear 62, also in said first gear case, fixed to a first transverse shaft 63 suitably and conveniently rotatably mounted, as at 64, 64, in arms 65, 65 of a bracket supported by said truck motor frame 19. The first transverse shaft 63 passes through an opening in a second gear case 66, suitably and conveniently supported upon the truck motor frame and/or the truck frame 15, at the side of said truck motor frame opposite the first gear case 60, and fixedly carries a second pinion 67, situated in said second gear case 66, which meshes with a second gear 68, also in said second gear case, fixed to a second transverse shaft 69 suitably and conveniently rotatably mounted upon the spaced apart side walls 22, 22 of the truck frame 15. The second transverse shaft 69 suitably and conveniently fixedly supports a third pinion 70, situated between said spaced apart side walls 22, 22 of said truck frame 15, which meshes with a spur gear 71, also situated between the spaced apart side walls 22, 22 of the truck frame 15. The spur gear 71 is suitably and conveniently rotatably mounted on the horizontal pivot pin 52 of the truck frame 15 at a side of the vertical pivot member 50. The teeth of said spur gear 71 are in mesh at the outer side of the spur gear 71 with a first drive gear 72 fixed upon the outer axle 24 of the truck frame 15 and are in mesh at the inner side of said spur gear 71 with a second drive gear 73 fixed upon the inner axle 24 of said truck frame 15. All of the third pinion 70, spur gear 71, first drive gear 72 and second drive gear 73 are in a plane passed vertically and longitudinally through the truck frame 15. Clearly, the wheels 17, 17 on said truck frame 15 can be driven in either direction by the electric motor 58 through the instrumentality of the first pinion 61, the first gear 62, the first transverse shaft 63, the second pinion 67, the second gear 68, the second transverse shaft 69, the third pinion 70, the spur gear 71, the first drive gear 72 and the second drive gear 73. It will be seen that both wheels 17, 17 upon the truck frame 15 are adapted to be driven by the single spur gear 71 which may be termed a common center drive gear for said wheels.

Inasmuch as it is unnecessary to accomplish drive of all of the wheels of the truck, the wheels 17, 17 which support the truck frame 16 need not be driven. That is to say, the truck having said truck frame 16 is an idler truck.

The vertical pivot members 50, 50 separately connect the truck frames 15 and 16 to the hinged girder frame 18, and, save for the connection between said truck frames 15 and 16 through the medium of said hinged girder frame 18 and said vertical pivot members 50, 50, the truck frames are independent of each other. Provision is included for swiveling and equalizing action between the girder elements 26 and 27 of the hinged girder frame 18 and each of the truck frames 15 and 16, and, hence, provision also is included for swiveling and equalizing action between said truck frames 15 and 16 themselves. The truck frames are assembled with the girder elements of the girder frame in such manner that there can be relative swiveling movement in both vertical and horizontal directions between said truck frames and said girder elements. The drive for the wheels 17, 17 which support the truck frame 15 is situated upon said truck frame 15 and the truck motor frame 19 in such manner as to preclude the possibility of interference with or hindrance of proper swiveling and equalizing action of the truck frame 15.

The girder elements 26 and 27 of the hinged girder frame 18 are interconnected to be capable of having limited oscillatory movement in a horizontal plane relative to each other so that the wheels on the truck frames 15 and 16 when in supporting relation to the gantry of a revolver of a crane will be adapted to follow a railroad track of curved conformation. Were the vertical hinge between the girder elements 26 and 27 not provided, the wheels upon the truck frames 15 and 16 would be incapable of sliding transversely to follow curved railroad track. Stated differently, it is the function of the hinged girder elements to permit relative lateral movement of the truck frames 15 and 16 in a horizontal plane thus to preclude the necessity of employing a more complicated and unsatisfactory mechanism, or construction and arrangement, as heretofore has been required, for causing or permitting wheels supporting truck frames of crane trucks to follow railroad tracks. In structures of commerce intended to be used for the same general purposes as is the truck of the invention, special means are required to be included to the end that relative transverse movement of wheels upon either one of oppositely situated trucks can be capable of occurring when the structures are made to travel along curved railroad tracks. This for the well known reason that the sets of wheels of crane trucks, at the four corners of the gantry of a revolver of a crane, upon inner and outer rails, respectively, of spaced apart tracks, which are opposite each other in direction crosswise of the revolver of a crane are required to be at variable distances apart depending upon the relation of said revolver to said spaced apart tracks. While the wheels upon oppositely disposed trucks supporting a revolver of a crane are traveling on straight spaced apart tracks so that the frame of the revolver extends longitudinally of the straight spaced apart tracks and opposite truck frames of said crane are alined in direction transversely of said spaced apart tracks at right angle relation thereto, the distance between said wheels of oppositely disposed trucks will remain fixed and equal to the track gauge. When, however, the wheels upon oppositely disposed trucks of a revolver crane are traveling on curved spaced apart tracks so that the frame of the revolver must of necessity extend at greater or less angular relation to the tracks and opposite truck frames of said crane must as a consequence aline in direction other than at right angle relation to said tracks, the distance between wheels upon oppositely disposed trucks obviously must vary to extent dictated by the arc of the curved spaced apart tracks if the wheels are to remain on the tracks. Evidently, the distance the wheels upon oppositely disposed trucks supporting the revolver of a crane are required to be spaced apart to remain upon curved spaced apart tracks will become increased in proportion as the plane of oppositely disposed truck frames of said revolver is required to be swung away from right angle relation to said spaced apart tracks, and vice versa. The wheels upon oppositely disposed trucks supporting the revolver of a crane normally will be at closest relation to each other when upon straight tracks. The construction and arrangement desirably will be such that when the truck of the invention is upon a straight track, the girder elements 26 and 27 will be in alined relation, and when said truck is upon a curved track, said girder elements 26 and 27 will be disposed at angular relation to each other. The direction and extent of relative swinging movement of the girder elements 26 and 27 of course will depend upon the direction and the arc, respectively, of curve of a railroad track along which the truck is made to travel. It will be apparent that only one of oppositely disposed trucks supporting the revolver of a crane need include hinged girder elements such as 26 and 27. Stated otherwise, when the revolver of a crane is required to be supported by four crane trucks, only two of the crane trucks need include a hinged girder frame such as 18, provided the trucks having hinged girder elements are on the same side of the revolver or at diagonally opposite points.

The vertical center pin 38 is assembled with the truck center plate 20 and the girder elements 26 and 27 of the hinged girder frame 18 in such manner that said girder frame can have not only swiveling and equalizing movement relative to the truck center plate, but also can have limited vertical movement relative to said truck center plate. Provision for relative vertical movement between the truck center plate 20 and the girder frame 18 is included in order that the truck may not be liable to become removed from a relatively low portion of a railroad track. Often it occurs that the levels of the beds of railroads vary, Supposing the revolver of a crane to be supported at its corners by four different trucks one of which is the truck of the invention, that three of the trucks happen to be running on relatively high railroad track while the fourth, the truck of the invention, say, is at a comparatively low spot of railroad track, and that the three trucks on relatively high track are alone supporting the gantry of said revolver, it will be obvious that the fourth truck could become derailed unless there were present means, such as the construction and arrangement as illustrated and described, for permitting said fourth truck to move vertically downward relative to said gantry thus to follow along a low stretch of railroad track. Clearly, the wheels of the truck of the invention are adapted to be held down against relatively low railroad track, by reason of the weight of the truck, in the event the truck may not at some particular time be supporting any part of the gantry of a revolver. The vertical distance between the truck center plate 20, adapted to support one corner of the gantry of a revolver of a crane, and a railroad track below the wheels 17, 17 can become increased without tendency toward causing said wheels to become derailed. Instead, downward movement by gravity of the truck relative to the truck center plate 20 and the vertical center pin 38 will occur with increase of vertical distance between said truck center plate 20 and a railroad track beneath said wheels 17, 17.

What is claimed is:

1. A truck comprising spaced apart truck frames, supporting wheels for said truck frames, a girder frame consisting of separate girder elements between and assembled with said truck frames, and a vertical center pin hingedly connecting said girder elements to each other.

2. A truck comprising spaced apart truck frames, supporting wheels for said truck frames, a girder frame consisting of separate girder elements between and assembled with said truck frames, a vertical center pin hingedly connecting said girder elements to each other, and a truck center plate carried by said vertical center pin.

3. A truck comprising spaced apart truck frames, supporting wheels for said truck frames, a girder frame consisting of separate girder elements between and assembled with said truck frames, a vertical center pin mounted in said girder elements to be capable of having vertical movement relative to the girder elements hingedly connecting said girder elements to each other, and a truck center plate carried by said vertical center pin.

4. A truck comprising spaced apart truck frames, supporting wheels for said truck frames, a girder frame consisting of separate girder elements between said truck frames, means supporting said separate girder elements upon said truck frames for relative swinging movement and equalizing movement of said supporting wheels and said girder frame, a vertical center pin hingedly connecting said girder elements to each other for relative swinging movement of the girder elements in a horizontal plane, and a truck center plate pivotally connected to said truck center pin.

5. A truck comprising spaced apart truck frames, supporting wheels for said truck frames, a girder frame consisting of separate girder elements between said truck frames, means supporting said separate girder elements upon said truck frames for relative swiveling and equalizing movement of said supporting wheels and girder frame, a vertical center pin mounted in said girder elements to be capable of having vertical movement relative to the girder elements hingedly connecting said girder elements to each other for relative swinging movement of the girder elements in a horizontal plane, and a truck center plate pivotally carried by said vertical center pin.

6. A crane truck comprising a girder frame consisting of separate girder elements, a vertical center pin hingedly connecting said girder elements, a truck center plate supported upon said vertical center pin for relative swiveling, equalizing and limited vertical movement of said girder elements and truck center plate, spaced apart truck frames at either end of said girder frame supporting the girder frame for relative swiveling and equalizing movement of said girder frame and truck frames, and supporting wheels upon said truck frames.

7. A crane truck comprising a girder frame consisting of hingedly connected girder elements, a vertical center pin with truck center plate supported upon said girder elements for relative swiveling movement of the girder elements and vertical center pin and for relative equalizing movements of said girder elements and truck center plate, spaced apart truck frames supporting opposite end portions of said girder frame for relative swinging and equalizing movement of said girder elements and truck frames, and supporting wheels upon said truck frames.

8. A crane truck comprising a girder frame consisting of hingedly connected girder elements, a vertical center pin with truck center plate supported upon said girder elements for relative swiveling and limited vertical movement of the girder elements and vertical center pin and for relative equalizing movements of the girder elements and truck center plate, spaced apart truck frames supporting opposite end portions of said girder frame for relative swinging and equalizing movement of said girder elements and truck frames, and supporting wheels upon said truck frames.

9. A truck comprising spaced apart truck frames, a girder frame consisting of separate girder elements between and assembled with the truck frames for relative swiveling and equalizing movement of said girder elements and truck frames, supporting wheels upon said truck frames, and a vertical center pin with truck center plate hingedly connecting the girder elements for relative swiveling movement of said girder elements and relative equalizing movement of the girder elements and truck center plate.

10. A truck comprising spaced apart truck frames, a girder frame consisting of separate girder elements between and assembled with the truck frames for relative swiveling and equalizing movement of said girder elements and truck frames, supporting wheels upon said truck frames, and a vertical center pin with truck center plate hingedly connecting the girder elements for relative swiveling movement of said girder elements and relative equalizing and limited vertical movement of said girder frame and truck center plate.

11. A truck comprising a girder frame consisting of girder elements hingedly connected to each other at an intermediate portion of said girder frame for relative oscillatory movement in a horizontal plane, a truck frame at each end of said girder frame supporting the girder element at the corresponding end of the girder frame for relative swiveling and equalizing movement of each truck frame and its supported girder element as well as for oscillatory movement of each truck frame together as a unit with its supported girder element in a horizontal plane relative to the other truck frame and its supported girder element, and supporting wheels upon each of said truck frames.

12. A truck comprising a vertical center pin with truck center plate, a girder frame consisting of girder elements hingedly connected to each other at an intermediate portion of said girder frame for relative oscillatory movement in a horizontal plane assembled with said vertical center pin for relative swiveling and equalizing movement of said girder frame and truck center plate, a truck frame at each end of said girder frame supporting the girder element at the corresponding end of said girder frame for relative swiveling and equalizing movement of each truck frame and its supported girder element as well as for oscillatory movement of each truck frame together as a unit with its supported girder element in a horizontal plane relative to the other truck frame and its supported girder element, and supporting wheels upon each of said truck frames.

13. A truck comprising a vertical center pin with truck center plate, a girder frame consisting of girder elements hingedly connected to each other at an intermediate portion of said girder frame for relative oscillatory movement in a horizontal plane assembled with said vertical center pin for relative swiveling, equalizing and limited vertical movement of said girder frame and truck center plate, a truck frame at each end of said girder frame supporting the girder element at the corresponding end of said girder frame for relative swiveling and equalizing movement of each truck frame and its supported girder element as well as for oscillatory movement of each truck frame together with its supported girder element as a unit in horizontal direction relative to the other truck frame and its supported girder element, and supporting wheels upon each of said truck frames.

14. The combination as specified in claim 9, a prime mover upon one of said truck frames, and a driving connection between said prime mover and one of said supporting wheels.

15. The combination as specified in claim 11, a truck motor frame supported by one of said truck frames, an electric motor upon said truck motor frame, and a driving connection between said electric motor and a wheel upon the truck frame having said truck motor frame.

ROBERT J. STODDARD.

REFERENCES CITED

The following references are of record in the file of this patent:

UNITED STATES PATENTS

| Number | Name | Date |
|---|---|---|
| 776,339 | Messick | Nov. 29, 1904 |
| 1,392,523 | Pereire et al. | Oct. 4, 1921 |
| 1,640,389 | Young | Aug. 30, 1927 |
| 1,682,517 | Houston | Aug. 28, 1928 |

FOREIGN PATENTS

| Number | Country | Date |
|---|---|---|
| 302,552 | Great Britain | Dec. 20, 1928 |